(12) United States Patent
Lee

(10) Patent No.: US 12,555,334 B2
(45) Date of Patent: Feb. 17, 2026

(54) THREE-DIMENSIONAL POSITIONING AND MOTION-DETECTING SYSTEM FOR HUMAN BODY AND OBJECT STATUS IN MIXED REALITY AND METHOD THEREOF

(71) Applicant: SMART SURGERY, Taipei (TW)

(72) Inventor: Yu-Chieh Lee, Taipei (TW)

(73) Assignee: SMART SURGERY, Taipei (TW)

( * ) Notice: Subject to any disclaimer, the term of this patent is extended or adjusted under 35 U.S.C. 154(b) by 136 days.

(21) Appl. No.: 18/427,608

(22) Filed: Jan. 30, 2024

(65) Prior Publication Data

US 2025/0139906 A1 May 1, 2025

(51) Int. Cl.
*G06T 19/00* (2011.01)
*G06T 19/20* (2011.01)
*G06V 40/20* (2022.01)

(52) U.S. Cl.
CPC ............ *G06T 19/006* (2013.01); *G06T 19/20* (2013.01); *G06V 40/28* (2022.01); *G06T 2219/2004* (2013.01); *G06T 2219/2016* (2013.01); *G06V 2201/07* (2022.01)

(58) Field of Classification Search
CPC ........ G06V 40/28; G06T 19/006; G06T 19/20
See application file for complete search history.

(56) References Cited

U.S. PATENT DOCUMENTS

2019/0380792 A1* 12/2019 Poltaretskyi ............... G06T 7/55
2024/0168546 A1* 5/2024 Sudharsan-Gröber ........................ G06F 3/017

OTHER PUBLICATIONS

Johnson et al., Patient Posture Correction and Alignment Using Mixed Reality Visualization and the HoloLens 2, The International Journal of Medical Physics Research and Practice, Nov. 2021 (Year: 2021).*

* cited by examiner

*Primary Examiner* — Charles Tseng
(74) *Attorney, Agent, or Firm* — Chih Feng Yeh; Yongjean Consulting Inc.

(57) ABSTRACT

A three-dimensional positioning and motion-detecting system for human body and object status in mixed reality and a method thereof are disclosed. A virtualization computing device performs gesture recognition for scaling, moving or 3D rotating a virtual posture model, to make posture model aligning points of the virtual posture model correspond to the posture model positioning points one by one, a virtual-and-real display device displays the adjusted virtual posture model in real time, when the virtual posture model is fixed, the virtualization computing device recognizes a hand position on the physical environment image, and detects a motion on the hand position based on the posture model positioning points, to generate operating position information and hand motion information. The virtual-and-real display device displays virtual-and-real integration of operating position information, hand motion information and a physical space.

9 Claims, 9 Drawing Sheets

A camera device obtains and provides a physical environment image of a physical space to a virtualization computing device, wherein the virtualization computing device is coupled to the camera device, the physical environment image includes a physical object having posture model positioning points, and the physical object includes a sensor disposed correspondingly to a particular position. ⟋ 701

The virtualization computing device generates a virtual posture model having posture model aligning points based on a default size. ⟋ 702

The virtualization computing device displays virtual-and-real integration of the posture model positioning points, the virtual posture model, the physical object, and the physical space through a virtual-and-real display device, wherein the virtual-and-real display device is coupled to the virtualization computing device. ⟋ 703

The virtualization computing device performs gesture recognition on the physical environment image to obtain an adjustment gesture for scaling, moving, or 3D rotating the virtual posture model, and the virtual-and-real display device displays the adjusted virtual posture model, so as to make the posture model aligning points of the virtual posture model correspond to the posture model positioning points of the physical object one by one. ⟋ 704

FIG. 7A

THREE-DIMENSIONAL POSITIONING AND MOTION-DETECTING SYSTEM FOR HUMAN BODY AND OBJECT STATUS IN MIXED REALITY AND METHOD THEREOF

CROSS-REFERENCE STATEMENT

The present application is based on, and claims priority from, TAIWAN Patent Application Serial Number 112141624, filed Oct. 30, 2023, the disclosure of which is hereby incorporated by reference herein in its entirety.

BACKGROUND

1. Technical Field

The present invention is related to a positioning and detecting system and a method thereof, more particularly to a three-dimensional positioning and motion-detecting system for human body and object status in mixed reality and a method thereof.

2. Related Arts

Some subjects (such as medical subjects) need to use physical objects (such as Annie teaching dolls) to assist teaching and learning operations. However, providing a large number of physical objects to assist teaching causes a significant increase in teaching costs, so only a small amount of physical objects can be provided to assist teaching subject to teaching cost considerations.

However, when the teaching time is constant, a small amount of physical objects for assisting teaching cannot satisfy every student to actually perform learning operations, and it undoubtedly also affects the quality of teaching and the learning effect of student. Therefore, an improved solution is required for this situation.

According to above-mentioned contents, what is needed is to develop an improved solution to solve the conventional problem of bad learning effect due to failure to provide enough physical objects for assisting teaching subject to teaching cost considerations.

SUMMARY

An objective of the present invention is to disclose a three-dimensional positioning and motion-detecting system for human body and object status in mixed reality and a method thereof, to solve the conventional problem of bad learning effect due to failure to provide enough physical objects for assisting teaching subject to teaching cost considerations.

In order to achieve the objective, the present invention provides a first embodiment of a three-dimensional positioning and motion-detecting system for human body and object status in mixed reality, and the system includes a camera device, a virtualization computing device, and a virtual-and-real display device, wherein the virtualization computing device includes a non-transitory computer-readable storage media and a hardware processor.

The camera device is configured to obtain and provide a physical environment image of a physical space. The virtualization computing device is coupled to the camera device. The non-transitory computer-readable storage media is configured to store computer readable instructions. The hardware processor is electrically connected to the non-transitory computer-readable storage media, and configured to execute the computer readable instructions to make the virtualization computing device execute: receiving the physical environment image from the camera device; setting posture model positioning points in the physical environment image; generating a virtual posture model having posture model aligning points, based on a preset size; performing gesture recognition on the physical environment image to obtain an adjustment gesture for scaling, moving or 3D rotating the virtual posture model, to make the posture model aligning points of the virtual posture model correspond and align to the posture model positioning points one by one; performing gesture recognition on the physical environment image to obtain a position-fixing gesture for fixing the virtual posture model; when the virtual posture model is fixed, recognizing a hand position on the physical environment image and detecting a motion on the hand position based on the posture model positioning points, to generate operating position information and hand motion information. The virtual-and-real display device is coupled to the virtualization computing device, and configured to display virtual-and-real integration of the posture model positioning points, the virtual posture model, and the physical space, display virtual-and-real integration of the adjusted virtual posture model in real time, and display the operating position information, the hand motion information, and the physical space.

In order to achieve the objective, the present invention provides a second embodiment of a three-dimensional positioning and motion-detecting system for human body and object status in mixed reality, includes a camera device, a virtualization computing device, a virtual-and-real display device, wherein the virtualization computing device includes a non-transitory computer-readable storage media and a hardware processor.

The camera device is configured to obtain and provide a physical environment image of a physical space, wherein the physical environment image comprises a physical object having posture model positioning points, and the physical object comprises a sensor disposed correspondingly to a particular position. The virtualization computing device is coupled to the camera device and the physical object. The non-transitory computer-readable storage media is configured to store computer readable instructions. The hardware processor is electrically connected to the non-transitory computer-readable storage media, and configured to execute the computer readable instructions to make the virtualization computing device execute: receiving the physical environment image from the camera device; generating a virtual posture model having posture model aligning points based on a preset size; performing gesture recognition on the physical environment image to obtain an adjustment gesture for scaling, moving or 3D rotating the virtual posture model to make the posture model aligning points of the virtual posture model correspond to the posture model positioning points of the physical object one by one; performing gesture recognition on the physical environment image to obtain a position-fixing gesture for fixing the virtual posture model at a position of the physical object; when the virtual posture model is fixed, obtaining a sensing signal of the sensor from the physical object, to recognize operating position information and hand motion information based on the sensing signal. The virtual-and-real display device is coupled to the virtualization computing device, and configured to display virtual-and-real integration of the virtual posture model, the physical object, and the physical space, display the adjusted virtual posture model in real time, and display virtual-andreal integration of the operating position information, the hand motion information, the physical object, and the physical space.

In order to achieve the objective, the present invention provides a second embodiment of a three-dimensional positioning and motion-detecting method for human body and object status in mixed reality, and the method includes steps of: obtaining and providing a physical environment image of a physical space to a virtualization computing device, by a camera device, wherein the virtualization computing device is coupled to the camera device; setting posture model positioning points on the physical environment image, by the virtualization computing device; generating a virtual posture model having posture model aligning points based on a preset size, by the virtualization computing device; displaying the posture model positioning points, the virtual posture model and the physical space through a virtual-and-real display device, by the virtualization computing device, wherein the virtual-and-real display device is coupled to the virtualization computing device; performing gesture recognition on the physical environment image to obtain an adjustment gesture for scaling, moving, or 3D rotating the virtual posture model, to make the posture model aligning points of the virtual posture model correspond and align to the posture model positioning points one by one, by the virtualization computing device, wherein the virtual-and-real display device displays the adjusted virtual posture model; performing gesture recognition on the physical environment image to obtain a position-fixing gesture for fixing the virtual posture model, by the virtualization computing device; when the virtual posture model is fixed, recognizing a hand position on the physical environment image, and detecting a motion on the hand position based on the posture model positioning points to generate operating position information and hand motion information, by the virtualization computing device; displaying virtual-and-real integration of the operating position information, the hand motion information and the physical space.

According to the above-mentioned system and method of the present invention, the virtualization computing device performs gesture recognition for scaling, moving or 3D rotating the virtual posture model, to make posture model aligning points of the virtual posture model correspond to the posture model positioning points one by one, the virtual-and-real display device displays the adjusted virtual posture model in real time, when the virtual posture model is fixed, the virtualization computing device recognizes the hand position on the physical environment image, and detects the motion on the hand position based on the posture model positioning points, to generate operating position information and hand motion information; the virtual-and-real display device displays virtual-and-real integration of operating position information, hand motion information and a physical space.

Therefore, the above-mentioned technical solution is able to achieve the efficiency of assisting teaching through mixed reality by gesture recognition and motion detection with spatially positioning of the virtual posture model.

BRIEF DESCRIPTION OF THE DRAWINGS

The structure, operating principle and effects of the present invention will be described in detail by way of various embodiments which are illustrated in the accompanying drawings.

FIG. 7A and FIG. 7B are flowcharts of a second embodiment of a three-dimensional positioning and motion-detecting method for human body and object status in mixed reality, according to the present invention.

DETAILED DESCRIPTION OF THE PREFERRED EMBODIMENTS

Figure 1:
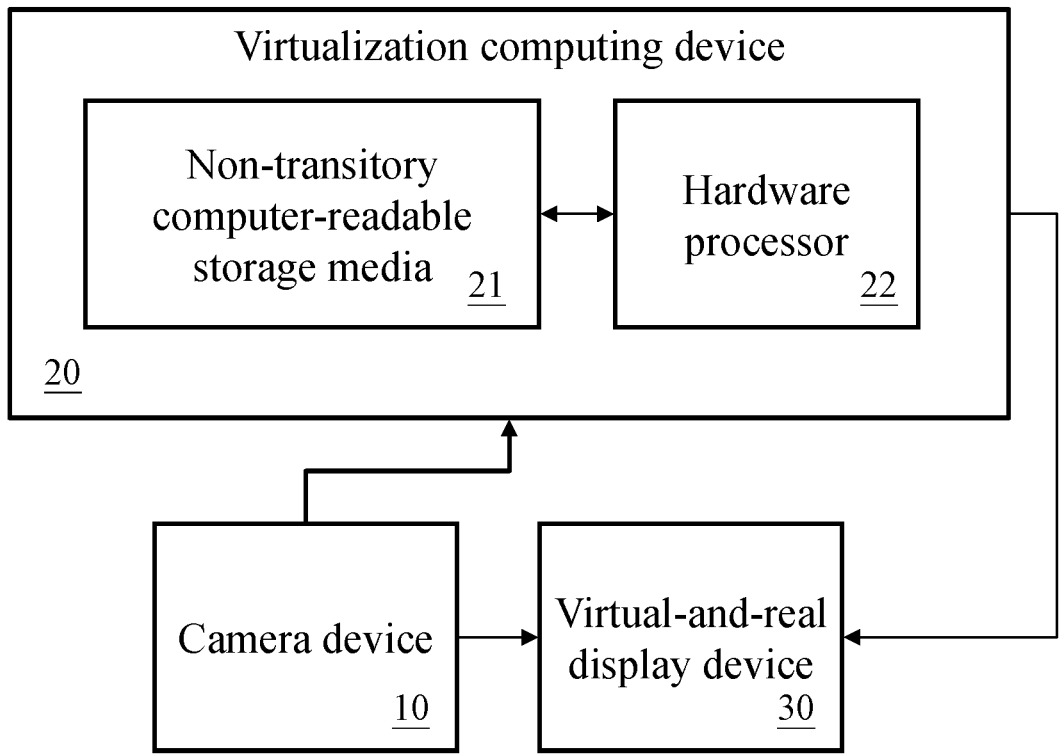
FIG. 1 is a system block diagram of a first embodiment of a three-dimensional positioning and motion-detecting system for human body and object status in mixed reality, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to"

another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The first embodiment of a three-dimensional positioning and motion-detecting system for human body and object status in mixed reality will be illustrated in the following paragraphs. The system is provided for medical teaching. Please refer to FIG. 1. FIG. 1 is a system block diagram of a first embodiment of a three-dimensional positioning and motion-detecting system for human body and object status in mixed reality, according to the present invention.

In order to achieve the objective, the present invention provides a first embodiment of a three-dimensional positioning and motion-detecting system for human body and object status in mixed reality, and the system includes a camera device 10, a virtualization computing device 20, a virtual-and-real display device 30. The virtualization computing device 20 includes a non-transitory computer-readable storage media 21 and a hardware processor 22.

The camera device 10 is configured to obtain and provide a physical environment image of a physical space. The virtualization computing device 20 is coupled to the camera device 10, the non-transitory computer-readable storage media 21 of the virtualization computing device 20 stores computer readable instructions, the hardware processor 22 of the virtualization computing device 20 is electrically connected to the non-transitory computer-readable storage media 21 of the virtualization computing device 20, and the hardware processor 22 of the virtualization computing device 20 executes the computer readable instructions to make the virtualization computing device 20 execute the following operations.

The virtualization computing device 20 is coupled to the camera device 10 by a wired transmission manner or a wireless transmission manner, the wired transmission manner can be, for example, a power line network, an optical network, and so on; the wireless transmission manner can be, for example, Wi-Fi, a mobile communication network (such as 4G, or 5G); however, these examples are merely for exemplary illustration, and the application field of the present invention is not limited to these examples for the virtualization computing device 20 to receive the physical environment image from the camera device 10.

Figure 2:
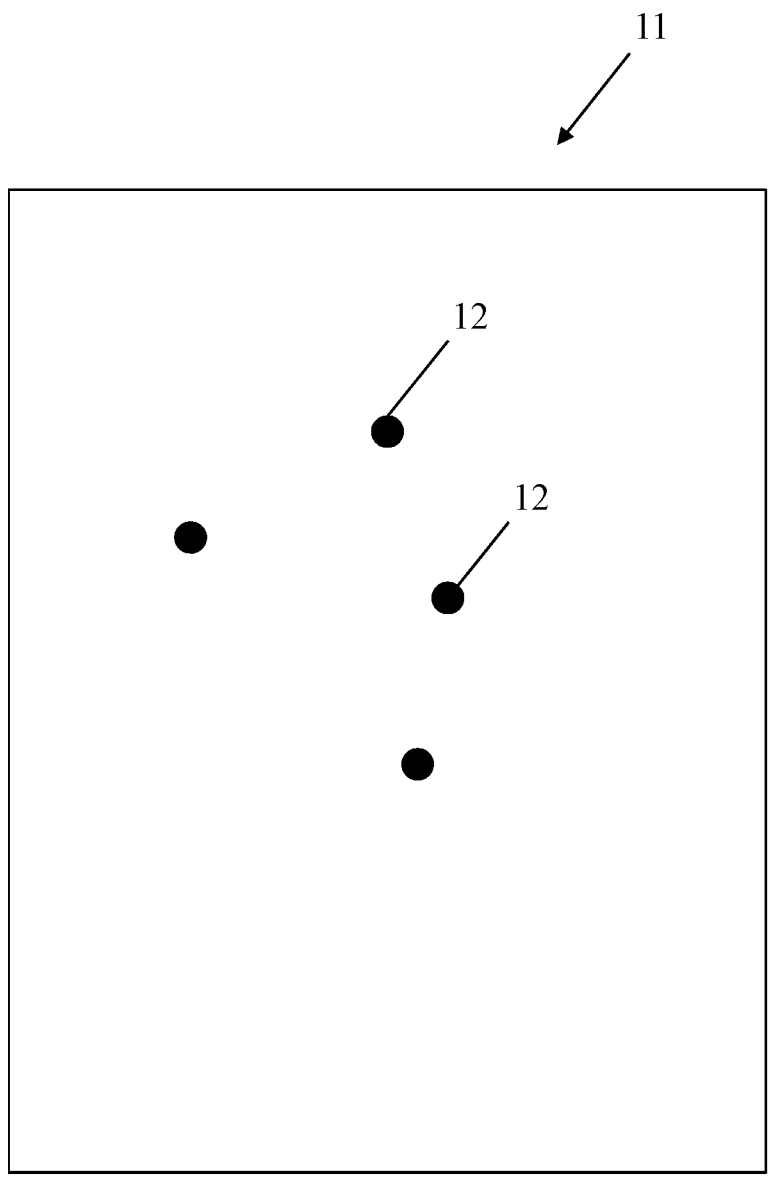
FIG. 2 is a schematic view of a physical environment image of the first embodiment of a three-dimensional positioning and motion-detecting system for human body and object status in mixed reality, according to the present invention.

The virtualization computing device 20 sets posture model positioning points 12 on the physical environment image 11. Please refer to FIG. 2. FIG. 2 is a schematic view of a physical environment image 11 of the first embodiment of a three-dimensional positioning and motion-detecting system for human body and object status in mixed reality, according to the present invention. It should be noted that a 3D coordinate of each posture model positioning point 12 with respect to other posture model positioning points 12 is fixed.

Figure 3:
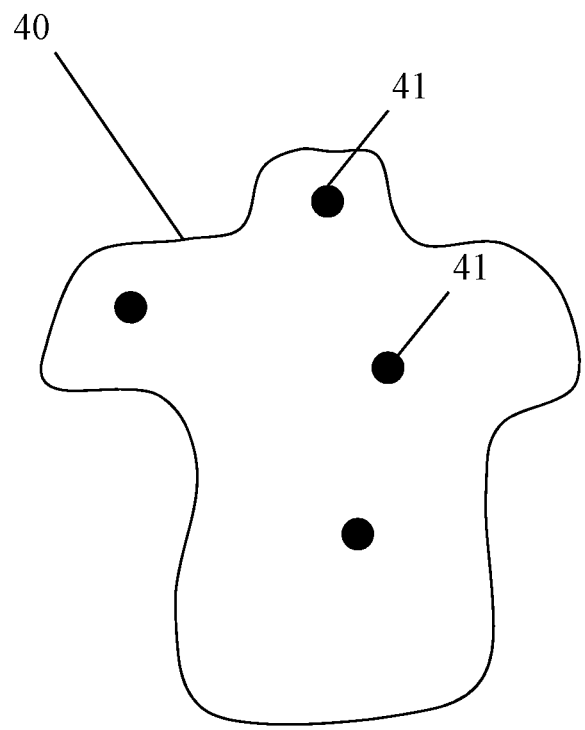
FIG. 3 is a schematic view of a virtual posture model of the first embodiment of a three-dimensional positioning and motion-detecting system for human body and object status in mixed reality, according to the present invention.

The virtualization computing device 20 generates a virtual posture model 40 having posture model aligning points 41 based on a preset size, as shown in FIG. 3. FIG. 3 shows a schematic view of a virtual posture model 40 of the first embodiment of a three-dimensional positioning and motion-detecting system for human body and object status in mixed reality, according to the present invention. It should be noted that a 3D coordinate of each posture model aligning point 41 with respect to other posture model aligning points 41 is fixed.

The virtual-and-real display device 30 is coupled to the virtualization computing device 20, and configured to display virtual-and-real integration of the posture model positioning points 12, the virtual posture model 40, and the physical space. The virtual-and-real display device 30 can adopt the naked vision 3D technology to display virtual-and-real integration of the posture model positioning points 12, the virtual posture model 40 and the physical space. In an embodiment, the virtual-and-real display device 30 can adopt a mixed reality device, which has transparent waveguides to couple light input grating and/or output grating, to display virtual-and-real integration of the posture model positioning points 12, the virtual posture model 40 and the physical space. However, these examples are merely for exemplary illustration, and the application field of the present invention is not limited to these examples.

When an operator operates the virtual posture model 40 by a gesture thereof, the physical environment image 11 obtained and provided by the camera device 10 includes an operating gesture, the virtualization computing device 20 performs gesture recognition on the physical environment image 11 to obtain an adjustment gesture for scaling, moving, or 3D rotating the virtual posture model 40. The above-mentioned gesture recognition is performed through a gesture model trained with machine learning to recognize a gesture operation. The gesture model can be, for example, a 3D model, skeleton model, or an appearance model. The machine learning can be, for example, Adaboost, decision tree, hidden Markov model (HMM), support vector machine (SVM), dynamic time warping, or artificial neural network. However, these examples are merely for exemplary illustration, and the application field of the present invention is not limited to these examples. The virtual posture model 40 adjusted by the scaling, moving, or 3D rotating operation is displayed by the virtual-and-real display device 30 in real time.

The operator uses the adjustment gesture to scale, move, or 3D rotate the virtual posture model 40, to make the posture model aligning points 41 of the virtual posture model 40 correspond and align to the posture model positioning points 12 one by one. The virtualization computing device 20 performs gesture recognition on the physical environment image 11 to obtain a position-fixing gesture for fixing the virtual posture model 40. It should be noted that the posture model aligning points 41 of the virtual posture model 40 and the posture model positioning points 12 correspond to each other one by one, so that the virtual posture model 40 can present a posture of a human body lying on its back, a posture of a human body lying on its side, or a posture of a human body lying prone. However, these examples are merely for exemplary illustration, and the application field of the present invention is not limited to these examples.

It should be noted that, the adjustment gesture can be a two-hand gesture (such as a rotating action of both hands, an expanding or retracting action of both hand), a one-hand gesture (such as a moving or rotating action of one hand); the position-fixing gesture can include a gesture with one hand (such as a clicking action of one hand to click and select a posture model positioning point or a posture model aligning point). However, these examples are merely for exemplary illustration, and the application field of the present invention is not limited to these examples.

The virtualization computing device 20 corresponds the posture model aligning points 41 of the virtual posture model 40 to the posture model positioning points 12 one by one, the virtualization computing device 20 automatically corrects to calculate an adjustment instruction for scaling, moving, or 3D rotating the virtual posture model 40, to automatically correct and align the virtual posture model 40 to the positions of the posture model positioning points 12.

When the virtual posture model 40 is fixed, the virtualization computing device 20 recognizes a hand position in the physical environment image and detects a motion on the hand position based on the posture model positioning points, to generate operating position information and hand motion information. It should be noted that, the operating position information can be, for example, a heart position or a tracheal position; the hand motion information can be, for example, press with both hands, thump with one hand, or slap with one hand; however, these examples are merely for exemplary illustration, and the application field of the present invention is not limited to these examples. The virtual-and-real display device 30 displays virtual-and-real integration of the operating position information, the hand motion information and the physical space.

The virtualization computing device 20 generates a virtual operation machine in the physical environment image, the virtual operation machine has a machine identification point, and the virtualization computing device 20 performs gesture recognition on the physical environment image to obtain a machine selection gesture for operating the virtual operation machine; the machine selection gesture includes single-hand operation gesture (such as selecting the virtual operation machine by one hand); however, these examples are merely for exemplary illustration, and the application field of the present invention is not limited to these examples. The virtualization computing device 20 performs position and motion recognition on the machine identification point based on the posture model positioning points, to generate the operating position information and machine motion information. It should be noted that the operating position information can be, for example, a heart position or tracheal position; the machine motion information can be, for example, cutting, pasting or inserting operation. However, these examples are merely for exemplary illustration, and the application field of the present invention is not limited to these examples. The virtual-and-real display device 30 displays a change in the operation of the virtual operation machine in real time, and also displays virtual-and-real integration of the operating position information, the machine motion information, and the physical space.

The hand motion detection and machine operation recognition performed by the virtualization computing device 20 is based on a hand motion model and a machine operation model constructed by machine learning, to recognize the corresponding hand motion and machine operation. The illustration of hand motion model and machine operation model can refer to that of the gesture model, so the detailed description is not repeated herein. The illustration of the machine learning can refer to that of above-mentioned machine learning, so the detailed description is mot repeated herein.

A physical operation machine can be disposed in the physical space, and when the camera device 10 obtains and provides the physical environment image of a physical space, the physical environment image contains the physical operation machine. The operation machine includes a machine identification point and a machine sensor, the virtualization computing device 20 is coupled to the operation machine through a wired transmission manner or a wireless transmission manner, the virtualization computing device 20 obtains a machine sensing signal from the machine sensor, the virtualization computing device 20 recognizes a position of the machine identification point based on the posture model positioning points and recognizes machine motion information based on the machine sensing signal, the virtualization computing device 20 looks up the machine motion information corresponding to the machine sensing signal based on a lookup table; the virtual-and-real display device 30 displays a change in the operation of the operation machine in real time, and displays virtual-and-real integration of the operating position information, the machine motion information, the physical object, and the physical space.

Figure 4A:
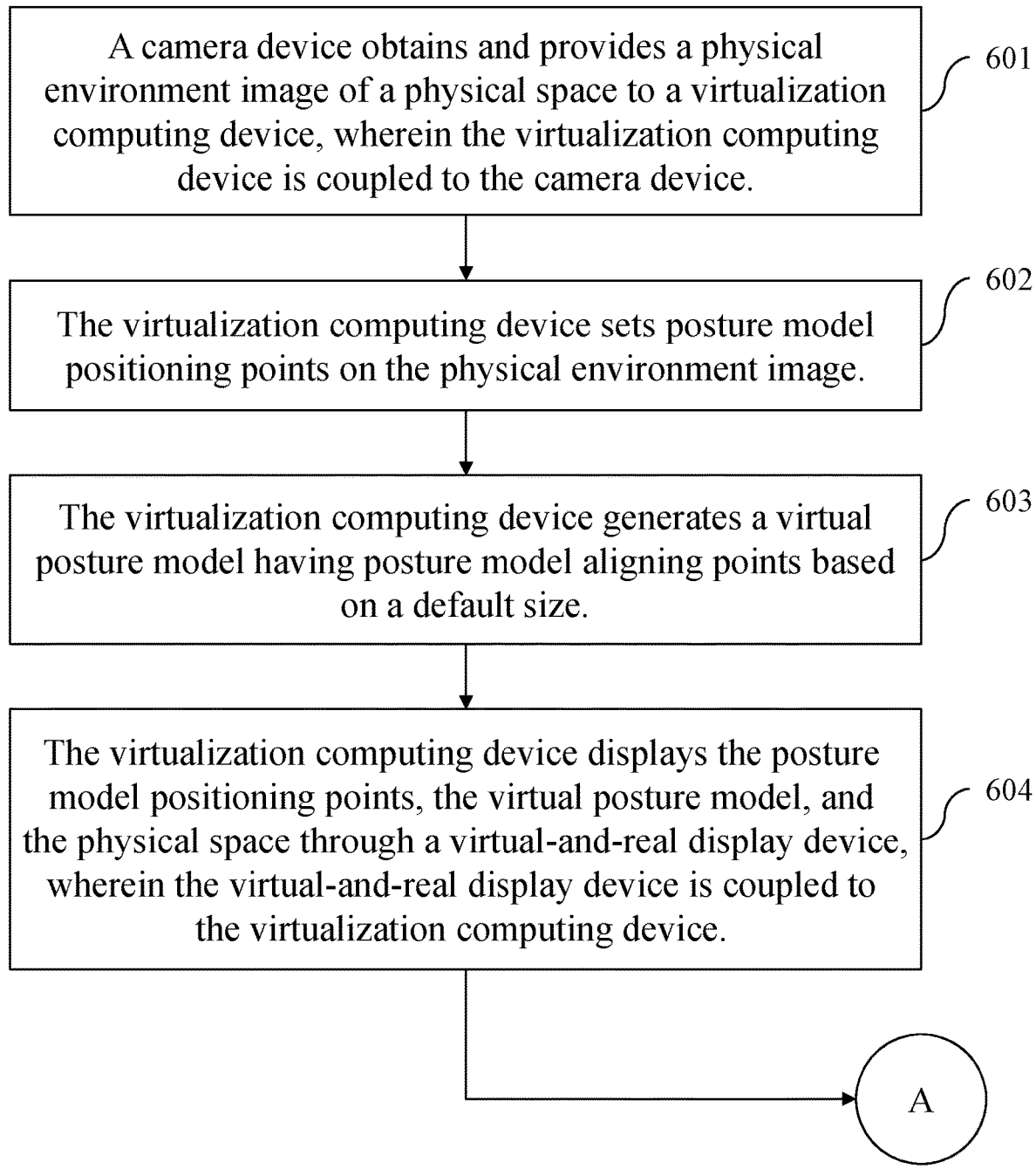
FIGS. 4A and 4B are flowcharts of an embodiment of a three-dimensional positioning and motion-detecting method for human body and object status in mixed reality, according to the present invention.
Figure 4B:
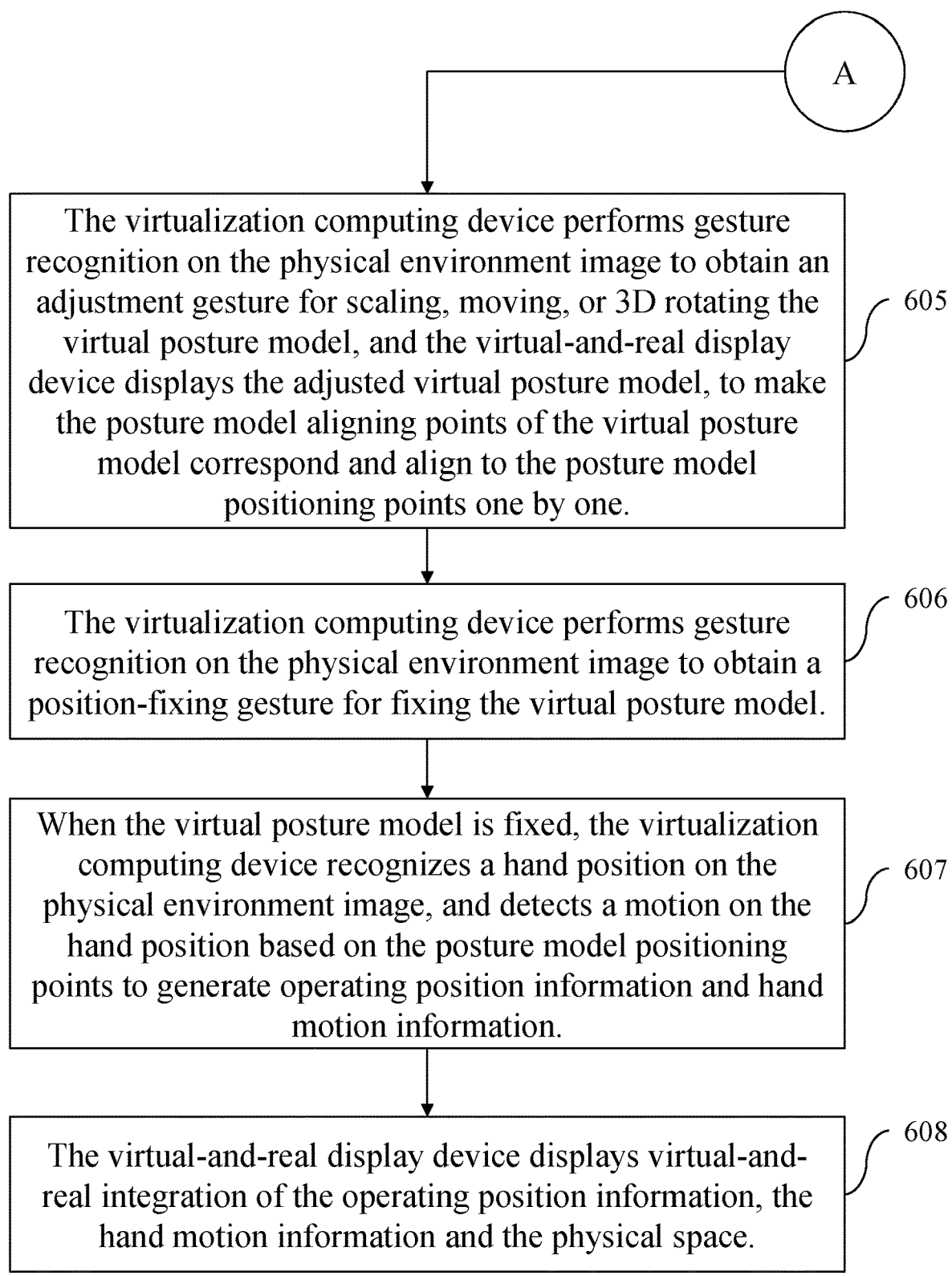

The operation of a first embodiment of the present invention will be illustrated in the following paragraphs. Please refer to FIG. 4A and FIG. 4B. FIG. 4A and FIG. 4B are flowcharts of an embodiment of a three-dimensional positioning and motion-detecting method for human body and object status in mixed reality, according to the present invention.

As shown in FIG. 4A and FIG. 4B, the first embodiment of a three-dimensional positioning and motion-detecting method includes the following steps.

In a step 601, a camera device obtains and provides a physical environment image of a physical space to a virtualization computing device, wherein the virtualization computing device is coupled to the camera device. In a step 602, the virtualization computing device sets posture model positioning points on the physical environment image. In a step 603, the virtualization computing device generates a virtual posture model having posture model aligning points based on a preset size. In a step 604, the virtualization computing device displays the posture model positioning points, the virtual posture model, and the physical space through a virtual-and-real display device, wherein the virtual-and-real display device is coupled to the virtualization computing device. In a step 605, the virtualization computing device performs gesture recognition on the physical environment image to obtain an adjustment gesture for scaling, moving, or 3D rotating the virtual posture model, and the virtual-and-real display device displays the adjusted virtual posture model, to make the posture model aligning points of the virtual posture model correspond and align to the posture model positioning points one by one. In a step 606, the virtualization computing device performs gesture recognition on the physical environment image to obtain a position-fixing gesture for fixing the virtual posture model. In a step 607, when the virtual posture model is fixed, the virtualization computing device recognizes a hand position on the physical environment image, and detects a motion on the hand position based on the posture model positioning points to generate operating position information and hand motion information. In a step 608, the virtual-and-real display device displays virtual-and-real integration of the operating position information, the hand motion information and the physical space.

Figure 5:
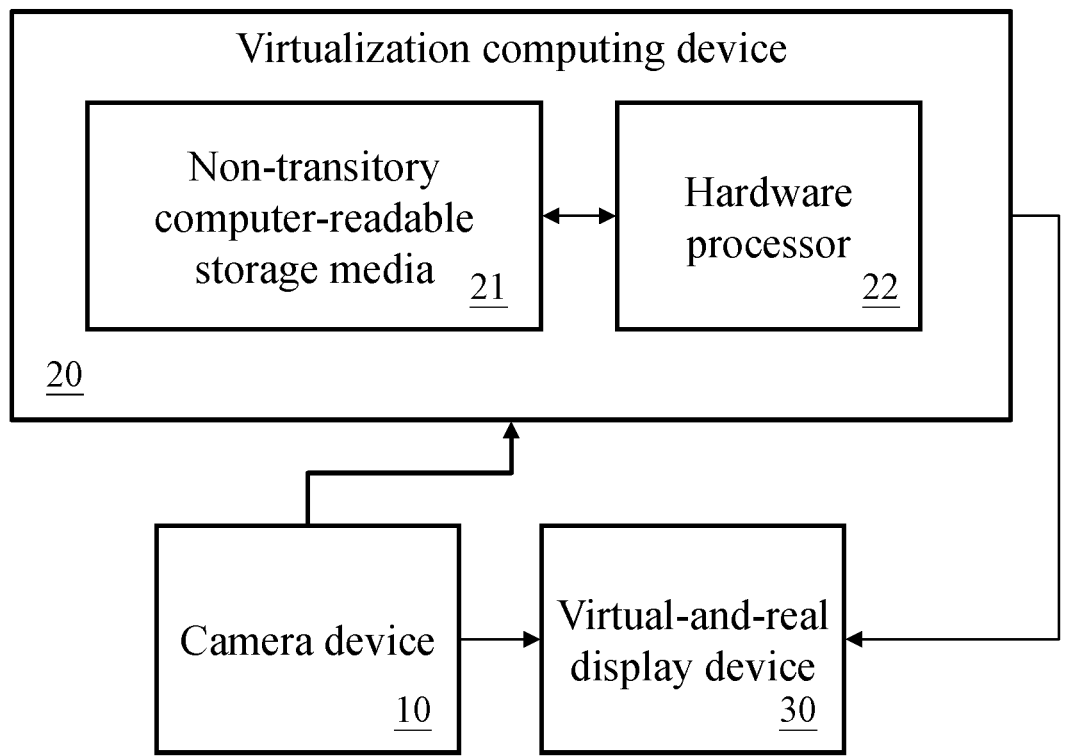
FIG. 5 is a system block diagram of a second embodiment of a three-dimensional positioning and motion-detecting system for human body and object status in mixed reality, according to the present invention.

The second embodiment of a three-dimensional positioning and motion-detecting system for human body and object status in mixed reality of the present invention will be illustrated in the following paragraphs. Please refer to FIG. 5. FIG. 5 is a system block diagram of a second embodiment of a three-dimensional positioning and motion-detecting system for human body and object status in mixed reality, according to the present invention.

As shown in FIG. 5, the second embodiment of the three-dimensional positioning and motion-detecting system includes a camera device 10, a virtualization computing device 20, and a virtual-and-real display device 30. The virtualization computing device 20 includes a non-transitory computer-readable storage media 21 and a hardware processor 22.

The virtualization computing device 20 is coupled to the camera device 10 and the physical object 50, the non-transitory computer-readable storage media 21 of the virtualization computing device 20 stores computer readable instructions, the hardware processor 22 of the virtualization computing device 20 is electrically connected to the non-transitory computer-readable storage media 21 of the virtualization computing device 20, and the hardware processor 22 of the virtualization computing device 20 executes the computer readable instructions to make the virtualization computing device 20 execute the following operations.

The virtualization computing device 20 is coupled to the camera device 10 and the physical object 50 by a wired transmission manner or a wireless transmission manner, the wired transmission manner can be, for example, a power line network or an optical network; the wireless transmission manner can be, for example, Wi-Fi, a mobile communication network (such as, 4G, 5G, and so on); however, these examples are merely for exemplary illustration, and the application field of the present invention is not limited to these examples for the virtualization computing device 20 to receive the physical environment image from the camera device 10.

Figure 6:
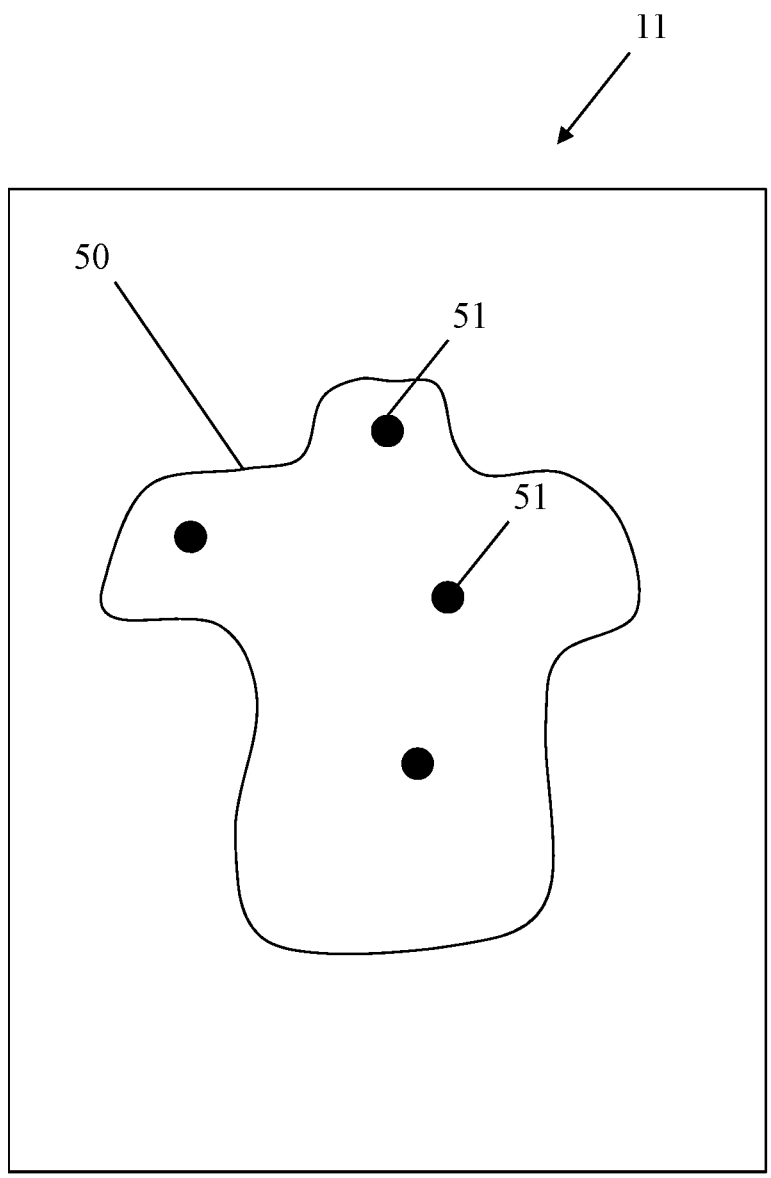
FIG. 6 is a schematic view of a physical environment image of the second embodiment of a three-dimensional positioning and motion-detecting system for human body and object status in mixed reality, according to the present invention.

The camera device 10 obtains and provides the physical environment image of the physical space, the physical environment image includes a physical object 50 having posture model positioning points 51, the physical object 50 includes a sensor disposed correspondingly to the particular position, as shown in FIG. 6. FIG. 6 is a schematic view of a physical environment image of the second embodiment of a three-dimensional positioning and motion-detecting system for human body and object status in mixed reality, according to the present invention.

The virtualization computing device 20 generates a virtual posture model 40 having posture model aligning points 41 based on a preset size, the virtual-and-real display device 30 is coupled to the virtualization computing device 20 and displays virtual-and-real integration of the virtual posture model 40, the physical object 50, and the physical space. In an embodiment, the virtual-and-real display device 30 adopts the naked vision 3D technology to display virtual-and-real integration of the virtual posture model 40, the physical object 50 and the physical space; in an embodiment, the virtual-and-real display device 30 adopts a mixed reality device, which has transparent waveguides to couple light input grating and/or output grating, to display virtual-and-real integration of the virtual posture model 40, the physical object 50 and the physical space. However, these examples are merely for exemplary illustration, and the application field of the present invention is not limited to these examples.

When an operator operates the virtual posture model 40 by a gesture, the physical environment image 11 obtained and provided by the camera device 10 includes an operating gesture, the virtualization computing device 20 performs gesture recognition on the physical environment image 11 to obtain an adjustment gesture for scaling, moving, or 3D rotating the virtual posture model 40, and the virtual posture model 40 adjusted by the scaling, moving, or 3D rotating operation is displayed by the virtual-and-real display device 30 in real time.

The adjustment gesture is used to scale, move, or 3D rotate virtual posture model 40, to make the posture model aligning points 41 of the virtual posture model 40 correspond to the posture model positioning point 51 of the physical object 50 one by one. The virtualization computing device 20 performs gesture recognition on the physical environment image 11 to obtain a position-fixing gesture for fixing the virtual posture model 40 at the position of the physical object 50.

The virtualization computing device 20 can also correspond the posture model aligning points 41 of the virtual posture model 40 to the posture model positioning points 51 of the physical object 50 one by one, the virtualization computing device 20 automatically corrects to calculate an adjustment instruction for scaling, moving, or 3D rotating the virtual posture model 40, to automatically correct and align the virtual posture model 40 to the positions of the physical object 50.

When the virtual posture model 40 is fixed, the virtualization computing device 20 obtains the sensing signal corresponding to the sensor from the physical object 50, to recognize operating position information and hand motion information based on the sensing signal. It should be noted that the operating position information can be, for example, a heart position or tracheal position; the hand motion information can be, for example, press with both hands, thump with one hand, or slap with one hand. However, these examples are merely for exemplary illustration, and the application field of the present invention is not limited to these examples. The virtual-and-real display device 30 displays virtual-and-real integration of the operating position information, the hand motion information, the physical object 50 and the physical space.

A physical operation machine can be disposed in the physical space; when the camera device 10 obtains and provides the physical environment image of the physical space, the physical environment image contains the physical operation machine. The operation machine includes a machine identification point and a machine sensor, the virtualization computing device 20 is coupled to the operation machine through a wired transmission manner or a wireless transmission manner, the virtualization computing device 20 obtains a machine sensing signal from a machine sensor, and the virtualization computing device 20 recognizes a position of the machine identification point based on the posture model positioning points, and recognizes machine motion information based on the machine sensing signal. The virtualization computing device 20 looks up the machine motion information corresponding to the machine sensing signal from a lookup table. It should be noted that the operating position information can be, for example, a heart position or tracheal position; the machine motion information can be, for example, cutting and pasting, or inserting operation. However, these examples are merely for exemplary illustration, and the application field of the present invention is not limited to these examples. The virtual-and-real display device 30 displays a change in the operation of the operation machine in real time, and displays virtual-and-real integration of the operating position information, the machine motion information, the physical object, and the physical space.

The virtualization computing device 20 generates a virtual operation machine in the physical environment image, the virtual operation machine has a machine identification point, the virtualization computing device 20 performs gesture recognition on the physical environment image to obtain a machine selection gesture for operating the virtual operation machine, the virtualization computing device 20 recognizes a position of the machine identification point of the virtual operation machine and detects a motion based on the posture model positioning points, to generate the operating position information and the machine motion information, and the virtual-and-real display device 30 displays a change in the operation of the virtual operation machine in real time, and displays virtual-and-real integration of the operating position information, the machine motion information, and the physical space.

Figure 7B:
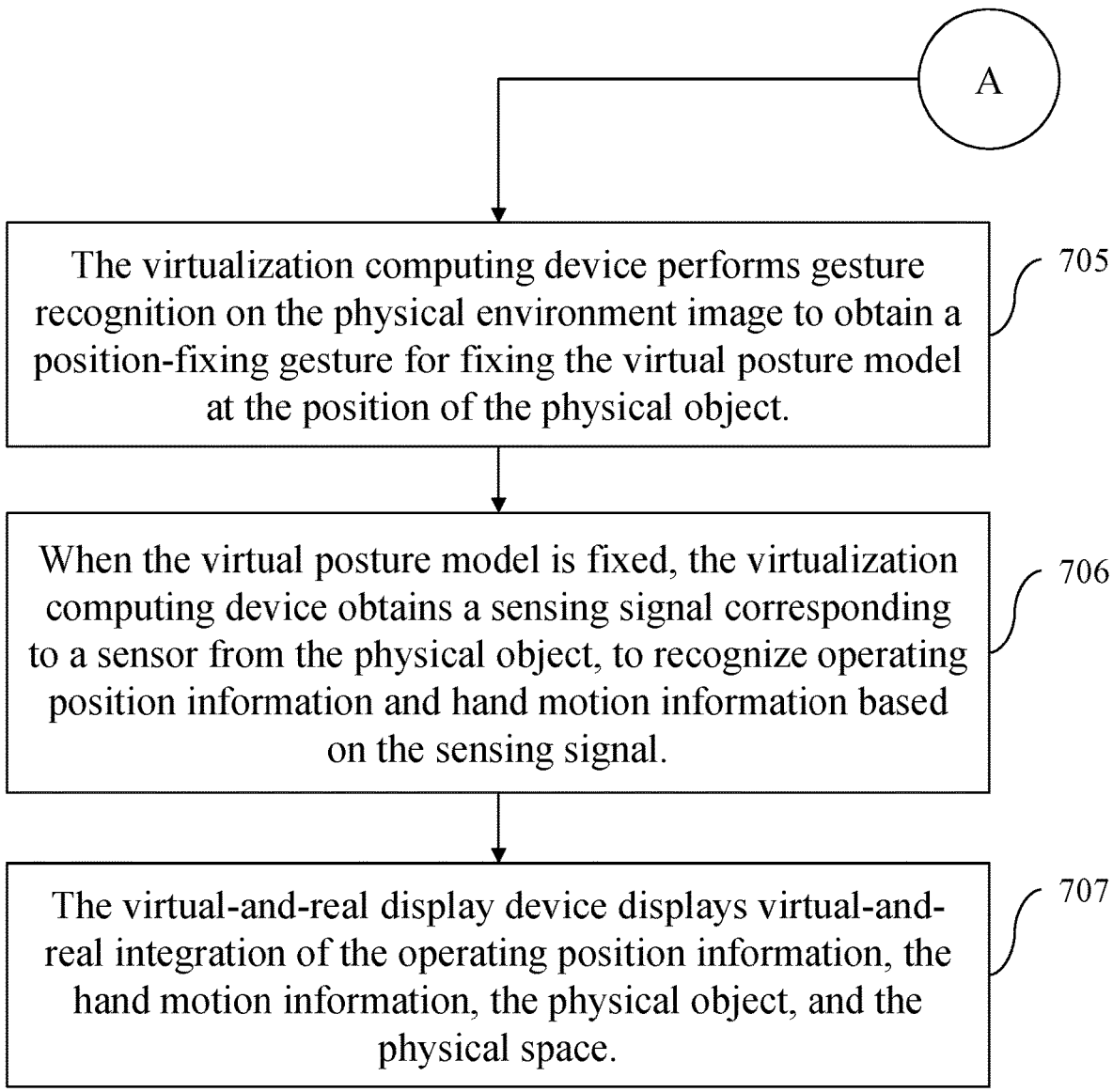

The operation of a first embodiment of the present invention will be illustrated in the following paragraphs. Please refer to FIG. 7A and FIG. 7B. FIG. 7A and FIG. 7B are flowcharts of a second embodiment of a three-dimensional positioning and motion-detecting method for human body and object status in mixed reality, according to the present invention.

As shown in FIG. 7A and FIG. 7B, the second embodiment of a three-dimensional positioning and motion-detecting method includes the following steps.

In a step 701, a camera device obtains and provides a physical environment image of a physical space to a virtualization computing device, wherein the virtualization computing device is coupled to the camera device, the physical environment image includes a physical object having posture model positioning points, the physical object includes a sensor disposed correspondingly to a particular position. In a step 702, the virtualization computing device generates a virtual posture model having posture model aligning points based on a preset size. In a step 703, the virtualization computing device displays virtual-and-real integration of the posture model positioning points, the virtual posture model, the physical object, and the physical space through a virtual-and-real display device, wherein the virtual-and-real display device is coupled to the virtualization computing device. In a step 704, the virtualization computing device performs gesture recognition on the physical environment image to obtain an adjustment gesture for scaling, moving, or 3D rotating the virtual posture model, and the virtual-and-real display device displays the adjusted virtual posture model, so as to make the posture model aligning points of the virtual posture model correspond to the posture model positioning points of the physical object one by one. In a step 705, the virtualization computing device performs gesture recognition on the physical environment image to obtain a position-fixing gesture for fixing the virtual posture model at the position of the physical object. In a step 706, when the virtual posture model is fixed, the virtualization computing device obtains a sensing signal corresponding to a sensor from the physical object, to recognize operating position information and hand motion information based on the sensing signal. In a step 707, the virtual-and-real display device displays virtual-and-real integration of the operating position information, the hand motion information, the physical object, and the physical space.

According to above-mentioned contents, the virtualization computing device performs gesture recognition for scaling, moving or 3D rotating the virtual posture model, to make posture model aligning points of the virtual posture model correspond to the posture model positioning points one by one, the virtual-and-real display device displays the adjusted virtual posture model in real time, when the virtual posture model is fixed, the virtualization computing device recognizes the hand position on the physical environment image, and detects the motion on the hand position based on the posture model positioning points, to generate operating position information and hand motion information; the virtual-and-real display device displays virtual-and-real integration of operating position information, hand motion information and a physical space.

Therefore, the above-mentioned technical solution is able to solve the conventional problem of bad learning effect due to failure to provide enough physical objects for assisting teaching subject to teaching cost considerations, so as to achieve the efficiency of assisting teaching through mixed reality by gesture recognition and motion detection with spatially positioning of the virtual posture model.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A three-dimensional positioning and motion-detecting system for human body and object status in mixed reality, comprising
a camera device, configured to obtain and provide a physical environment image of a physical space;
a virtualization computing device, coupled to the camera device, wherein the virtualization computing device comprises:
a non-transitory computer-readable storage medium, configured to store computer readable instructions;
a hardware processor, electrically connected to the non-transitory computer-readable storage medium, and configured to execute the computer readable instructions to make the virtualization computing device execute:
receiving the physical environment image from the camera device;
setting posture model positioning points in the physical environment image;
generating a virtual posture model having posture model aligning points, based on a preset size;
performing gesture recognition on the physical environment image to obtain an adjustment gesture for scaling, moving or three-dimensional (3D) rotating the virtual posture model, to make the posture model aligning points of the virtual posture model correspond and align to the posture model positioning points one by one;
performing gesture recognition on the physical environment image to obtain a position-fixing gesture for fixing the virtual posture model; and
when the virtual posture model is fixed, recognizing a hand position on the physical environment image and detecting a motion on the hand position based on the posture model positioning points, to generate operating position information and hand motion information; and
a virtual-and-real display device, coupled to the virtualization computing device, and configured to display virtual-and-real integration of the posture model positioning points, the virtual posture model, and the physical space, display virtual-and-real integration of the adjusted virtual posture model in real time, and display the operating position information, the hand motion information, and the physical space.

2. The three-dimensional positioning and motion-detecting system for human body and object status in mixed reality according to claim 1, wherein the virtualization computing device executes:

generating a virtual operation machine in the physical environment image, wherein the virtual operation machine comprises a machine identification point;
performing gesture recognition on the physical environment image to obtain a machine selection gesture for operating the virtual operation machine; and
performing position and motion recognition on the machine identification point based on the posture model positioning points, to generate the operating position information and machine motion information; and
wherein the virtual-and-real display device displays a change of the virtual operation machine during operation in real time, and displays virtual-and-real integration of the operating position information, the machine motion information, and the physical space.

3. The three-dimensional positioning and motion-detecting system for human body and object status in mixed reality according to claim 1, wherein the physical environment image comprises an operation machine, the operation machine comprises a machine identification point and a machine sensor, the virtualization computing device is coupled to the operation machine, and the virtualization computing device executes:
obtaining a machine sensing signal from the machine sensor; and
recognizing a position of the machine identification point based on the posture model positioning points, and recognizing machine motion information based on the machine sensing signal;
wherein the virtual-and-real display device displays a change of the operation machine during operation in real time, displays virtual-and-real integration of the operating position information, the machine motion information, a physical object, and the physical space.

4. A three-dimensional positioning and motion-detecting method for human body and object status in mixed reality, comprising:
obtaining and providing a physical environment image of a physical space to a virtualization computing device, by a camera device, wherein the virtualization computing device is coupled to the camera device;
setting posture model positioning points on the physical environment image, by the virtualization computing device;
generating a virtual posture model having posture model aligning points based on a preset size, by the virtualization computing device;
displaying the posture model positioning points, the virtual posture model and the physical space through a virtual-and-real display device, by the virtualization computing device, wherein the virtual-and-real display device is coupled to the virtualization computing device;
performing gesture recognition on the physical environment image to obtain an adjustment gesture for scaling, moving, or three-dimensional (3D) rotating the virtual posture model, to make the posture model aligning points of the virtual posture model correspond and align to the posture model positioning points one by one, by the virtualization computing device, wherein the virtual-and-real display device displays the virtual posture model in accordance with the adjustment gesture;
performing gesture recognition on the physical environment image to obtain a position-fixing gesture for fixing the virtual posture model, by the virtualization computing device;
when the virtual posture model is fixed, recognizing a hand position on the physical environment image, and detecting a motion on the hand position based on the posture model positioning points to generate operating position information and hand motion information, by the virtualization computing device; and
displaying virtual-and-real integration of the operating position information, the hand motion information and the physical space, by the virtual-and-real display device.

5. The three-dimensional positioning and motion-detecting method for human body and object status in mixed reality according to claim 4, further comprising:
generating a virtual operation machine in the physical environment image, by the virtualization computing device, wherein the virtual operation machine comprises a machine identification point;
performing gesture recognition on the physical environment image to obtain a machine selection gesture for operating the virtual operation machine, by the virtualization computing device; and
performing position and motion recognition on the machine identification point based on the posture model positioning points, to generate the operating position information and machine motion information, by the virtualization computing device; and
displaying a change of the virtual operation machine during operation in real time, and displaying virtual-and-real integration of the operating position information, the machine motion information, and the physical space, by the virtual-and-real display device.

6. The three-dimensional positioning and motion-detecting method for human body and object status in mixed reality according to claim 4, further comprising:
providing an operation machine in the physical environment image, wherein the operation machine comprises a machine identification point and a machine sensor;
coupling the virtualization computing device to the operation machine, and obtaining a machine sensing signal from the machine sensor;
recognizing a position of the machine identification point based on the posture model positioning points, and recognizing machine motion information based on the machine sensing signal, by the virtualization computing device;
displaying a change of the operation machine during operation in real time, and displaying virtual-and-real integration of the operating position information, the machine motion information, a physical object, and the physical space, by the virtual-and-real display device.

7. A three-dimensional positioning and motion-detecting system for human body and object status in mixed reality, comprising:
a camera device, configured to obtain and provide a physical environment image of a physical space, wherein the physical environment image comprises a physical object having posture model positioning points, and the physical object comprises a sensor disposed correspondingly to a particular position;
a virtualization computing device, coupled to the camera device and the physical object, wherein the virtualization computing device comprises:

a non-transitory computer-readable storage medium, configured to store computer readable instructions; and
a hardware processor, electrically connected to the non-transitory computer-readable storage medium, and configured to execute the computer readable instructions to make the virtualization computing device execute:
   receiving the physical environment image from the camera device;
   generating a virtual posture model having posture model aligning points based on a preset size;
   performing gesture recognition on the physical environment image to obtain an adjustment gesture for scaling, moving or three-dimensional (3D) rotating the virtual posture model to make the posture model aligning points of the virtual posture model correspond to the posture model positioning points of the physical object one by one;
   performing gesture recognition on the physical environment image to obtain a position-fixing gesture for fixing the virtual posture model at a position of the physical object; and
   when the virtual posture model is fixed, obtaining a sensing signal of the sensor from the physical object, to recognize operating position information and hand motion information based on the sensing signal; and
a virtual-and-real display device, coupled to the virtualization computing device, and configured to display virtual-and-real integration of the virtual posture model, the physical object, and the physical space, display the adjusted virtual posture model in real time, and display virtual-and-real integration of the operating position information, the hand motion information, the physical object, and the physical space.

8. The three-dimensional positioning and motion-detecting system for human body and object status in mixed reality according to claim 7, wherein the physical environment image comprises an operation machine, the operation machine comprises a machine identification point and a machine sensor, the virtualization computing device is coupled to the operation machine, and the virtualization computing device executes:
   obtaining a machine sensing signal from the machine sensor; and
   recognizing a position of the machine identification point based on the posture model positioning points, and recognizing machine motion information based on the machine sensing signal;
   wherein the virtual-and-real display device displays a change of the operation machine during operation in real time, displays virtual-and-real integration of the operating position information, the machine motion information, the physical object, and the physical space.

9. The three-dimensional positioning and motion-detecting system for human body and object status in mixed reality according to claim 7, wherein the virtualization computing device executes:
   generating a virtual operation machine in the physical environment image, wherein the virtual operation machine comprises a machine identification point;
   performing gesture recognition on the physical environment image to obtain a machine selection gesture for operating the virtual operation machine; and
   performing position and motion recognition on the machine identification point based on the posture model positioning points, to generate the operating position information and machine motion information; and
   wherein the virtual-and-real display device displays a change of the virtual operation machine during operation in real time, and displays virtual-and-real integration of the operating position information, the machine motion information, and the physical space.

* * * * *